C. A. MAHLER.
MACHINE FOR SETTING EYELETS IN AUTOMOBILE CURTAINS.
APPLICATION FILED FEB. 12, 1916.

1,207,964.

Patented Dec. 12, 1916.
6 SHEETS—SHEET 1.

Inventor
Carl A. Mahler
By John A. Bommhardt
Atty

C. A. MAHLER.
MACHINE FOR SETTING EYELETS IN AUTOMOBILE CURTAINS.
APPLICATION FILED FEB. 12, 1916.

1,207,964.

Patented Dec. 12, 1916.

C. A. MAHLER.
MACHINE FOR SETTING EYELETS IN AUTOMOBILE CURTAINS.
APPLICATION FILED FEB. 12, 1916.

1,207,964.
Patented Dec. 12, 1916.
6 SHEETS—SHEET 4.

Inventor
Carl A. Mahler
By John A. Bommhardt
Atty

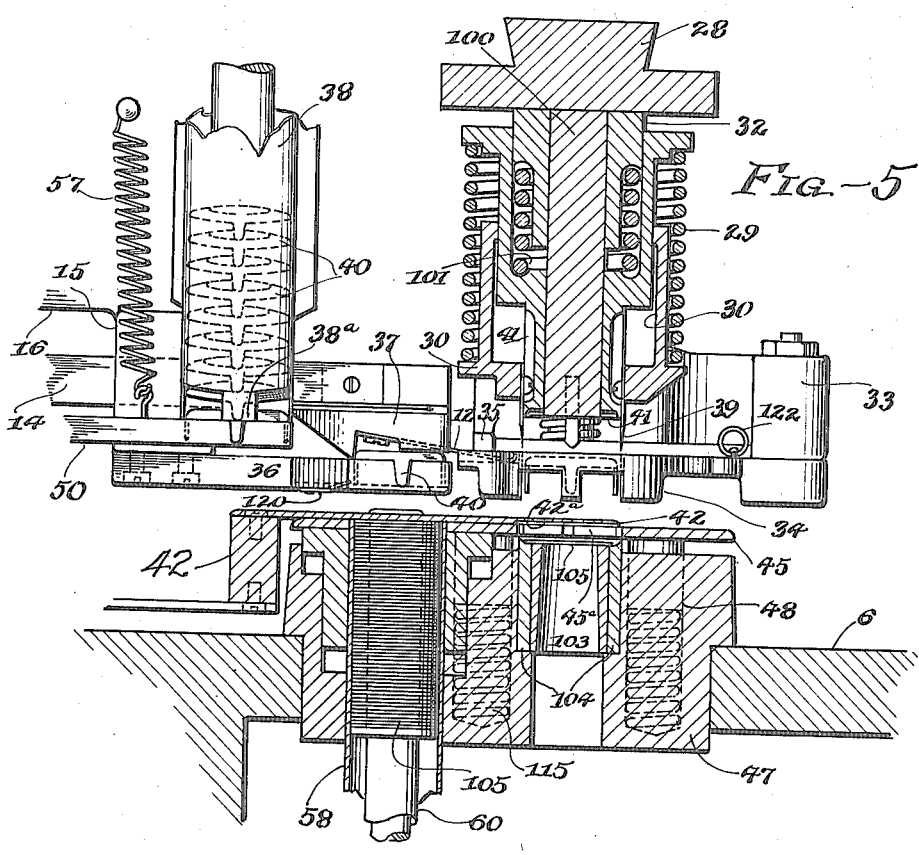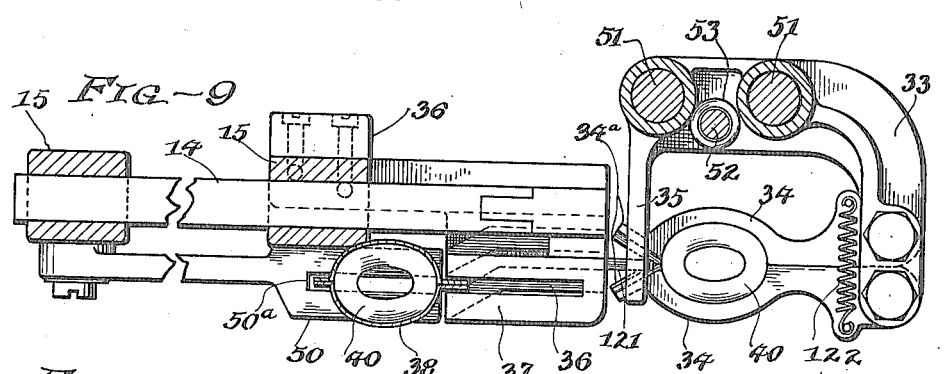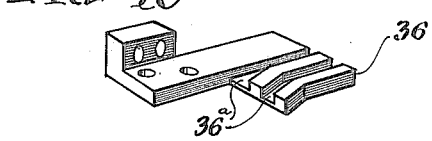

C. A. MAHLER.
MACHINE FOR SETTING EYELETS IN AUTOMOBILE CURTAINS.
APPLICATION FILED FEB. 12, 1916.
1,207,964.
Patented Dec. 12, 1916.
6 SHEETS—SHEET 6.
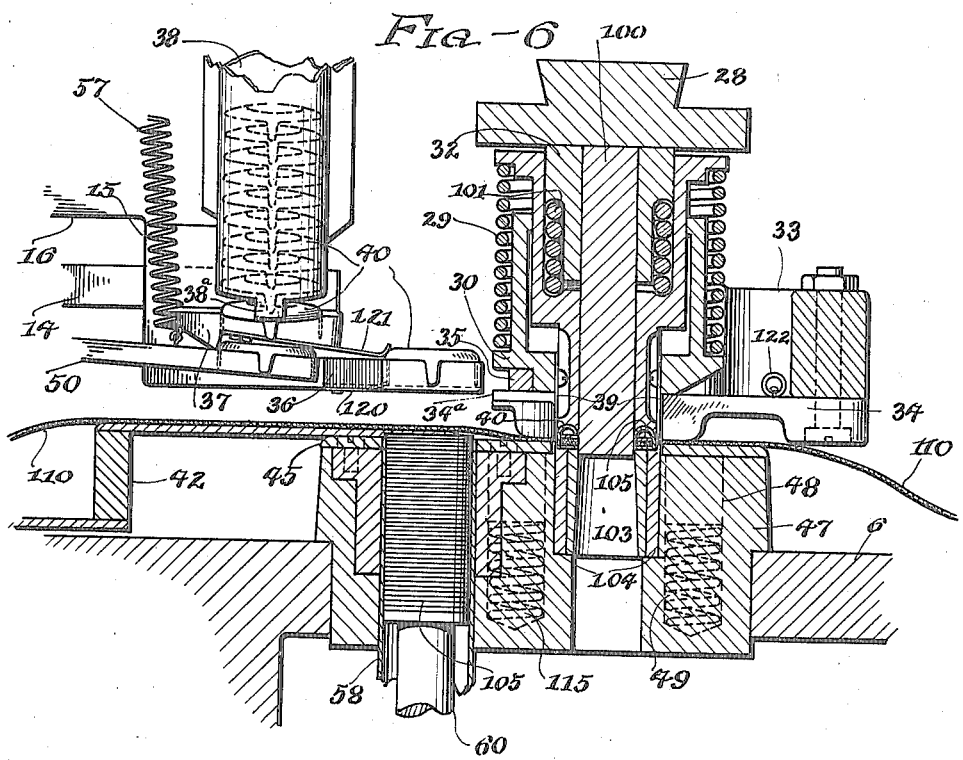
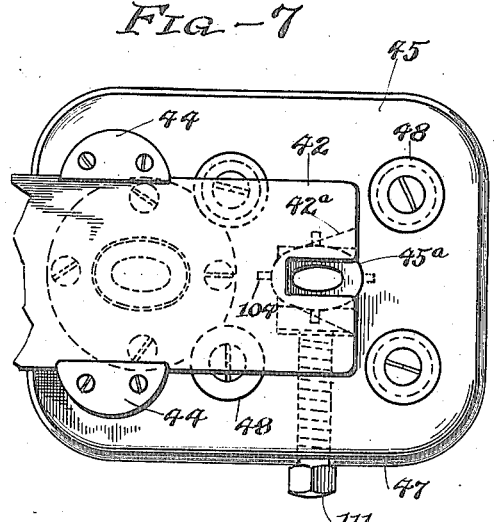
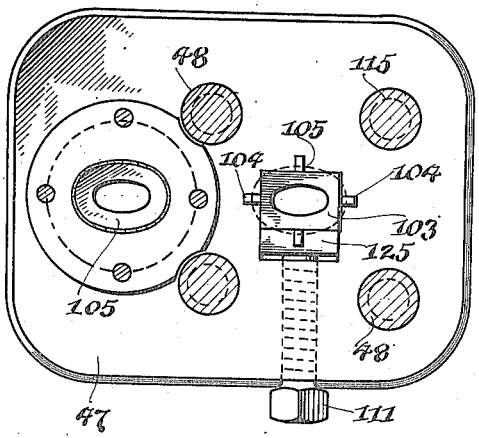
Inventor
Carl A. Mahler
By John A. Bonnhardt
Atty

UNITED STATES PATENT OFFICE.

CARL A. MAHLER, OF CLEVELAND, OHIO.

MACHINE FOR SETTING EYELETS IN AUTOMOBILE-CURTAINS.

1,207,964.  Specification of Letters Patent.  Patented Dec. 12, 1916.

Application filed February 12, 1916. Serial No. 77,914.

*To all whom it may concern:*

Be it known that I, CARL A. MAHLER, a citizen of the United States, residing at Cleveland, in the county of Cuyahoga and State of Ohio, have invented certain new and useful Improvements in Machines for Setting Eyelets in Automobile-Curtains, of which the following is a specification.

This invention relates to machines particularly adapted and intended for setting eyelets or gromets and especially eyelets inserted in automobile curtains or the like. These eyelets comprise an opening in the fabric or material, and a bushing surrounding said opening, said bushing consisting of two parts, an upper annular part having prongs at its outer edge which are inserted through the fabric, and a lower part or washer on the opposite side of the fabric, against or under which the prongs are bent or clenched, whereby the opening is surrounded by the metal parts on both sides of the fabric, the upper part being also provided with recesses in which the turn-button which is inserted through the eyelet is engaged.

The object of the present invention is to form an improved machine for cutting the holes and setting the bushings or eyelet pieces, the machine having the form of a power press provided with appropriate mechanism for performing the operations indicated.

The invention is illustrated in the accompanying drawings, in which—

Figure 1:
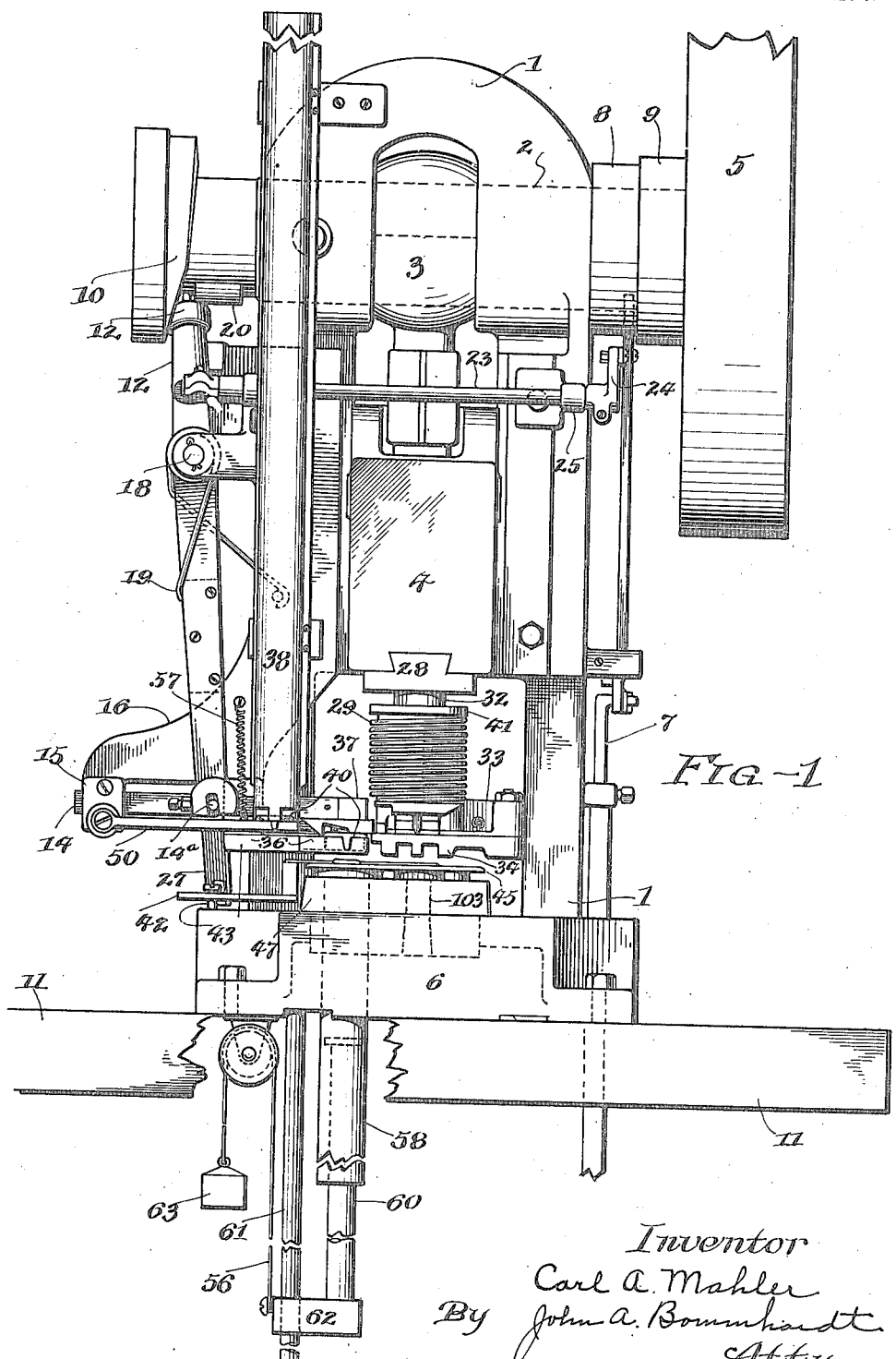
Figure 2:
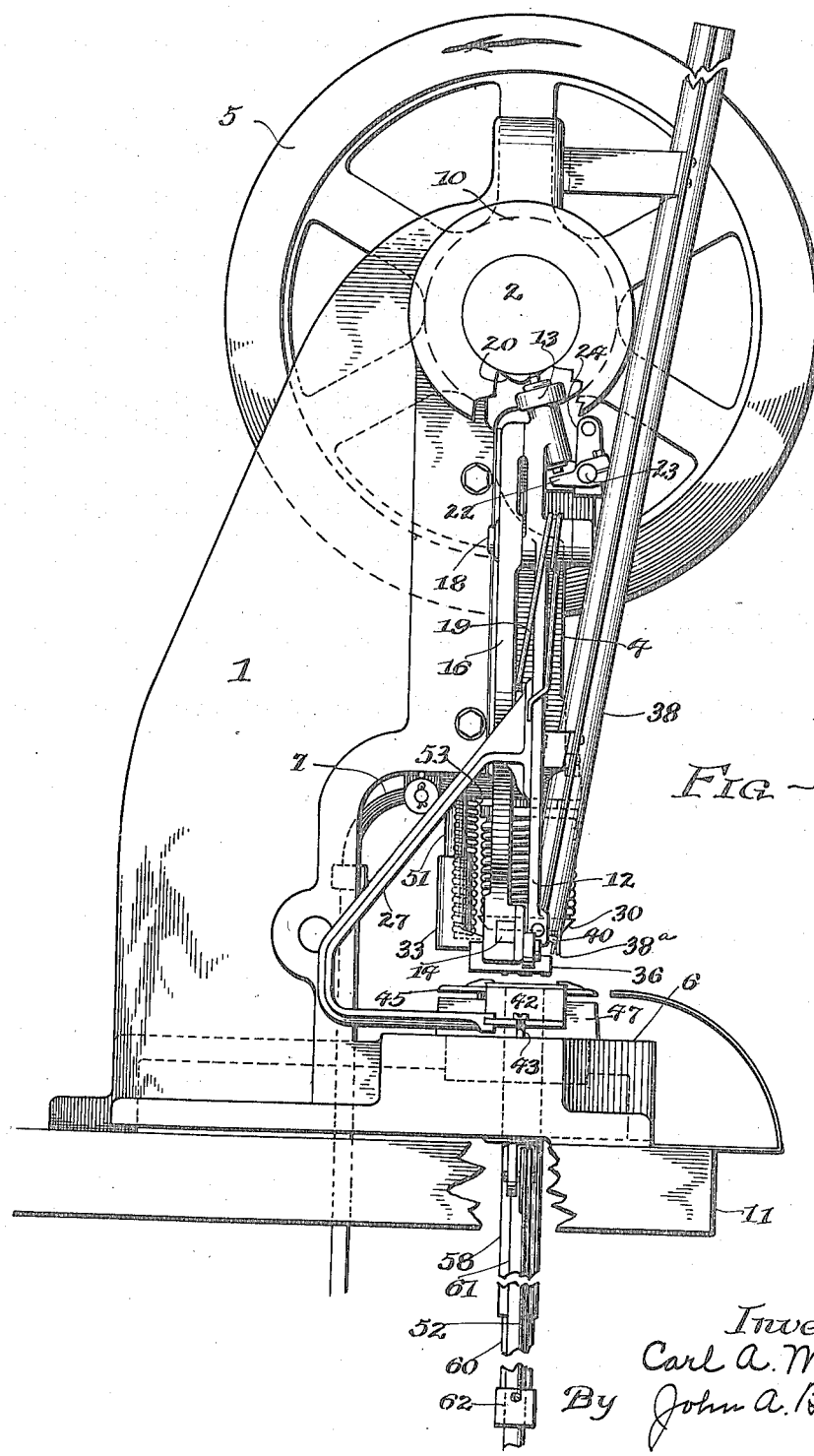
Figure 3:
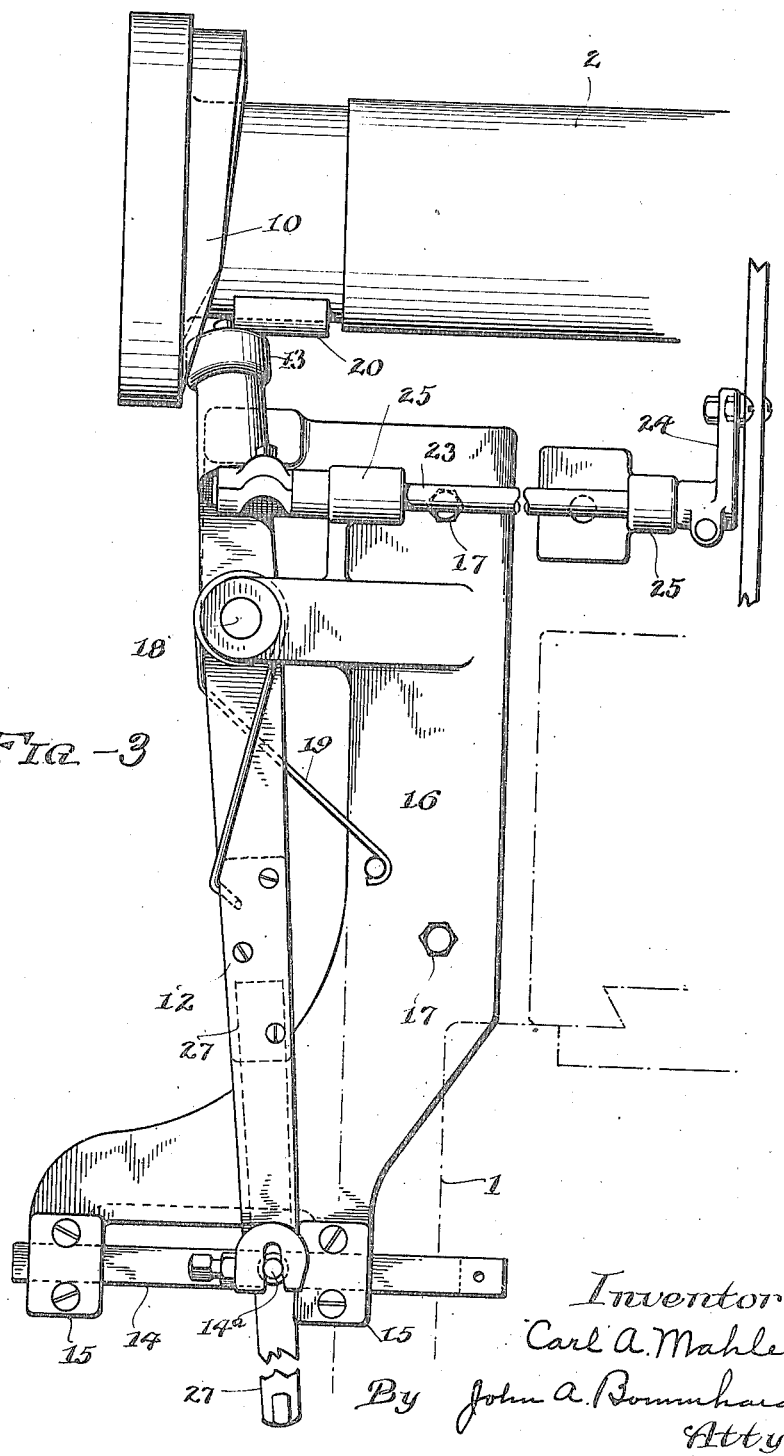
Figure 4:
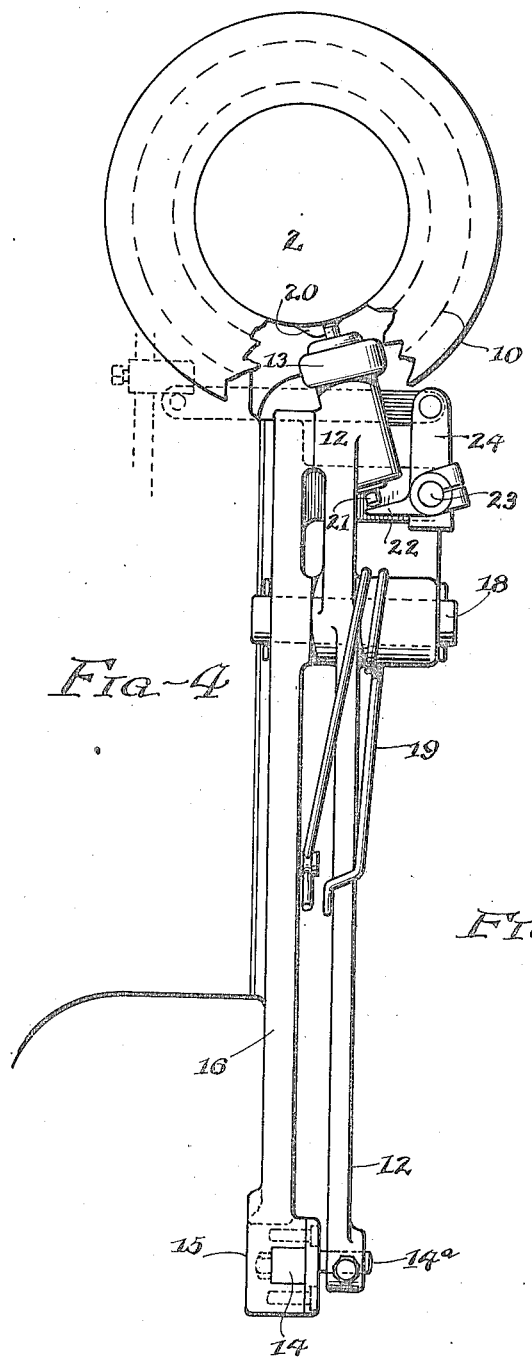
Figure 13:
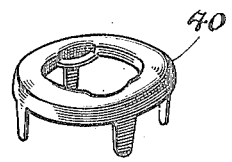
Figure 14:
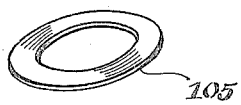
Figure 12:
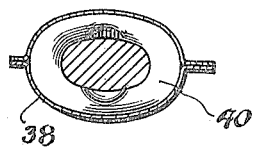
Figure 11:
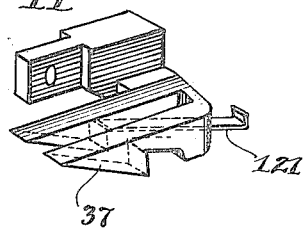

Figure 1 is a front elevation of the press. Fig. 2 is a side elevation. Fig. 3 is a detail in front elevation of the feeding or transfer attachment, and Fig. 4 is a side elevation of the same. Fig. 5 is a vertical section of the punching and clenching dies or parts before inserting the eyelet. Fig. 6 is a similar view of the same parts after inserting. Fig. 7 is a detail in plan of the lower die parts. Fig. 8 is a detail in plan of the lower die and chute or washer magazine. Fig. 9 is a detail plan of the gripping and transferring mechanism of the upper die or punch mechanism. Fig. 10 is a perspective view of the transfer block. Fig. 11 is a perspective view of the picker claw for removing eyelets from chute. Fig. 12 is a cross section of eyelet chute with a guide rod through center. Figs. 13 and 14 are perspective views of the upper and lower metal parts of the eyelet.

The press is a single action open back bench power press, having a press frame 1 with pitman 3, ram 4, die bed 6, clutch rod 7 and crank shaft 2 provided with two cams 10 and 20 which operate a transfer lever 12 and an automatic stop mechanism. This bench press is mounted on the top of a wooden bench 11 or iron table and is securely attached thereto. A foot treadle (not shown) is located upon the floor beneath the press and is connected by an appropriate rod and spring to the tripping device of a standard clutch mechanism. The details of such a clutch mechanism are well known and are not shown in the drawings.

The fly-wheel 5 is mounted loose on the end of the crank shaft 2 at the right of the operator, the crank shaft 2 running from right to left in bearings at the top of the press frame 1. The fly-wheel is driven by a belt connected with a driving pulley on a counter shaft or other source of power. Between the bearings on either side of the frame 1 is located the crank which operates the pitman 3 which moves the ram 4 up and down in the slides. To operate this ram the treadle is depressed by the foot which pulling upon the rod 7 trips the clutch 8 connecting the fly-wheel 5 with the crank shaft. This by rotating the shaft 2 causes the ram 4 to reciprocate up and down as long as the clutch is engaged with the fly-wheel. By removing the pressure of the foot on the treadle the clutch is disengaged from the fly-wheel and the crank shaft becomes automatically released at a certain point on its movement so that the ram 4 stops at the top of the stroke in every case by the brake 9. By this means an operator by depressing his foot and immediately releasing the treadle thereafter is enabled to make one complete stroke of the ram whenever he chooses to operate the mechanism. This mechanism is old and requires no particular description. In this way the mechanism is under full control of the operator, being idle while the foot is off the treadle and in operation as long as the treadle is depressed by the foot. The operator is thus able to make single strokes or operate continuously for an indefinite period at will.

A portion of the mechanism for inserting the eyelet is attached to the ram 4 of the press and is termed the punch part or parts. Another portion of the mechanism is located on the bed 6 of the press and is termed the die part or parts.

The pronged eyelet pieces 40 are carried in chute like magazine 38 which is attached to the front of the press frame 1 above the punch parts, and the oval washer pieces 105 are stored in another tubular chute or magazine 58 beneath the bed 6 of the press.

In order to remove the eyelets 40 and the washers 105 from their chutes 38 and 58 to their respective positions over and under the position on the curtain fabric where they are to be set, a transfer mechanism is provided which is designed to pick one piece from each chute and transfer them to the position desired. This transfer mechanism consists of a bracket or arm 16 attached to the face of the press frame 1 by the bolts 17 and having a lug at its upper end carrying a pivot 18. On this pivot 18, acting as a fulcrum, is attached the transfer lever 12. At the upper extremity of this lever 12 is a small roller 13 which bears against the face of a cam 10 attached to the crank shaft 2. At its lower extremity the lever 12 engages a stud 14ª on the sliding transfer bar 14 which moves back and forth in the bearings or boxes 15 at the lower extremity of the arm 16. A spring 19 is coiled about the hub on the pivot 18 and engages the lever 12 and the arm 16 in such a way as to hold the roller 13 against the face of the cam 10. Attached to the lever 12 about midway between the lower extremity and the pivot 18 is an extension bracket 27 which extends down, back and underneath the fabric 110 and engages with the lower transfer slide 42.

When the press is at rest with the ram 4 at the top of the stroke the cam 10 is so positioned that the roller 13, pressed against it by the spring 19, is at the extreme end of its travel to the left; while the lower extremity operating the slide 14 as well as the extension bracket 27 and lower transfer slide 42, are at the extreme right end of their travel. When the operator throws the shaft 2 into action the cam 10 rotates with the shaft 2. The contour of the cam face is such that in making the first half revolution, carrying the ram 4 to the bottom of its stroke, the roller 13 is forced back to the extreme right of its travel and the lower extremity of lever 12 with the slide bar 14 and extension arm 27 with lower transfer slide 42 are at the extreme left position of their travel. During the second half of the shaft revolution, while the ram 4 is raising, the cam is of such shape as to present a receding face in front of the roller 13 which is pressed toward it by the spring 19. Thus while the cam 10 forces the movement of the roller 13, lever 12 and all the attached parts during the downward stroke of the ram, it merely recedes before roller 13 on the upward portion of the stroke allowing the spring 19 to reverse the operation of the lever 12 and all its connected parts.

The spring return, on the forward feeding movement, permits safeguarding the delicate parts of the mechanism, in case there should be a miscarriage in the feeding of the eyelet 40, or the washer 105 into position over the dies. This is accomplished by means of an automatic stop device which operates in this event to prevent the tripping of the clutch mechanism 8 until the obstruction is removed. By this means the press cannot be operated so long as the obstruction remains.

The details of this safety device are shown in Figs. 1, 2, 3, and 4. As will be seen this consists of a connection between the lever 12 and the clutch 8 as follows: The small cam lug 20 is attached to the periphery of the crank shaft in position to engage the end of the small pin 21 which passes longitudinally through a lug on the upper end of the lever 12 and which is kept pressed upward against shaft 2. The cam lug 20 is located on shaft 2 at such a point in its circumference that it can engage the pin 21 only at the upper end of the stroke of the ram 4. And its position longitudinally on the shaft is such that it engages the pin 21 only when the roller 13 is not resting against the face of the cam 10, or at the point of rest at the extreme left of its travel. Attached to the front of the press frame 1 and carrying from left to right across its upper portion and riding in bearings 25, is a small rocking shaft 23. Attached to the left end of this shaft 23 is a small arm 22 which extends into position beneath the pin 21. At the opposite end of the rocking shaft 23 is another arm 24 which communicates by means of a connecting rod with the clutch rod 7.

When operating, the pin 21 engages the shaft 2 during its entire revolution. And as long as this pin is free to press against the periphery of the shaft 2 there is room for the rocking arm 22 to move upward a short distance. As before mentioned the cam 20 covers the entire distance of travel of the roller 13 except at its position at the extreme left at the end of the up-stroke of the ram 4. If, however, owing to some difficulty in the transfer of the eyelet 40 or the washer 105 the spring 19 fails to return the roller 13 to the right position, the pin 21 will engage with the cam lug 20 which will press it down against the end of the arm 22 on the end of the rocking shaft 23 preventing the arm 22 from moving upward. In case the operator endeavors to throw the machine into action while the roller 13 is out of place the clutch mechanism 8 cannot be tripped and is out of engagement. The moment the transfer lever is released the clutch may be put into engagement and the operation carried on.

The feeding mechanism consists of two complete parts, one for storing and transferring the pronged eyelets 40 into position over the die 103, and the other for storing and transferring the oval washer underneath the curtain.

In the upper feeding mechanism, 38 is a tubular chute or magazine of oval cross-section made to fit neatly about the periphery of the pronged eyelets 40. These eyelets are first stacked within this chute which is of a size to permit the eyelets to slip downward by their own weight. A further control over the eyelets may be provided by an auxiliary guide in the shape of an oval rod passing through the center of the eyelets. It is quite possible to obtain a better control by this means than that supplied by the wall of the chute 38 acting upon the exterior only of the eyelet 40. The bottom of the chute 38 ends in four prongs 38$^a$, the height of these prongs being equal to the height over-all of the eyelet 40. The prongs on the bottom of the chute are located in relation to the section of the chute so as to come adjacent to the prongs on the eyelets within the tube. That is, two of the prongs are located at the extremities of the long diameter of the tube and two at the extremities of the short diameter.

Closing the bottom of the chute 38 is a bar piece 50 which acts as a floor to the chute preventing the eyelets 40 from falling through. This bar piece 50 is fulcrumed on the bearing 15 on the lower end of the bracket 16. To this bar piece 50 is attached a spring 57 which is connected with a stud on the bracket 16. The purpose of the spring being to keep the bar piece 50 tight up against the bottom of the chute, at the same time permitting it to be forced down sufficiently to permit the drawing out of one eyelet at a time at the right of the chute 38 by the picker 37. The end of the bar piece 50 is slotted as at 50$^a$ to permit the prongs of the eyelet 40 to drop through it so that the body of the eyelet rests on the upper surface of the bar piece 50. Attached to the end of the upper slide bar 14 is a picker claw 37, the left end of which is in the shape of a depending hook. The picker claw is forked (see Figs. 9 and 11) so as to pass between the prongs on the eyelet in the chute. The vertical position of this picker is such that its wedge shaped end is located at a point lying between the top of the lowest eyelet and the next one above in the chute 38.

When, during the operation of the machine, the transfer slide bar moves to the left, the picker 37 moves in between the two lower eyelets in the chute separating the lowest eyelet by forcing it down along the inclined under surface of the claw 37. The bar 50 drops with the eyelet and when the hooked projection, on the claw 37, passes beyond the top of the eyelet it draws the eyelet up into the hook so that on the return movement of the picker it is drawn out to the right from under the bottom of the chute 38 into an intermediate position on the guide block 36 where it is retained by the small spring 120 during the reverse movement of the picker 37.

The guide block 36 is channeled as indicated at 36$^a$ to permit the body of the eyelet 40 to rest upon its upper surface. The channels being constructed and inclined to act as guides to the prongs of the eyelets to lead the eyelet in its proper course from chute 38 to its ultimate position in the jaws 34 over the die. The guide block 36 is attached to one of the bearings 15 of the bracket 16.

On the under surface of the picker claw 37 will be seen a small spring pawl 121 which rides up over the eyelet 40 during the movement of the picker 37 to the left and drops down behind this eyelet at the end of the movement where it is in position to push the eyelet forward during the return movement of the picker 37 to the right. (See Figs. 5 and 6.)

Under the ram 4 of the press and hinged to the sliding bracket 33 are a pair of jaws 34 for gripping an eyelet 40. These jaws 34 are so placed as to grip an eyelet centrally under the punch parts and over the die parts of the mechanism.

When the picker 37 moves to the right the spring pawl under the picker pushes the eyelet 40 forward until it encounters the flared extensions 34$^a$ on the jaws 34. The pressure of the eyelet on these extensions wedges the jaws open and the eyelet entering is clasped tightly within the embrace of the jaws and held securely in position until the drop of the punch forces it downward through the fabric 110 onto the die. The small spring 122 acts to close these jaws upon the eyelet. The jaws 34, as will be seen, are hinged at the right to a bracket 33, which slides on two vertical rods 51 at the rear of the punch. The vertical rods are attached to the punch holder 28. A pressure spring 53 coiled around a rod 52 is provided which acts to force the bracket 33 and the jaws 34 down upon the fabric 110 in a manner to clamp the fabric upon the pressure plate which lies underneath. The arm 35 is a forward extension of the sliding bracket 33 bearing upon the ends of the jaws 34 in order to balance the pressure upon the jaws of the spring 53.

In the lower or washer feeding mechanism, 58 is a tubular chute or magazine holding the oval washers 105 stacked in storage ready for transfer (one at a time) to a position on the pressure plate 45 over the die 103. This chute consists of a sheet metal tube of oval cross section similar to the shape of the washer piece. The tubular plunger 60 acts to push the washers up against the transfer slide 42 which covers the top of the chute 58. The top of the tubular plunger is capped with an oval metal piece which approximately fills the interior cross-section of the chute. The lower end of the plunger is screwed or socketed in a horizontal plunger bracket 62. This plunger bracket is provided with a hole to slide on the rod 61. To a stud on this bracket 62 is attached a cord 56 which passes up over a pulley wheel 54 and which is suspended from the frame of the press 1. At the other end of the cord 56 is a counterweight 63 which creates the pressure on the plunger tube 60, against the washers 105 in the chute 58. The plunger 60 is made tubular so that the washers may be stacked on a rod passing through the oval holes of the washers and by this means introduced into the chute from the bottom, the plunger 60 having first been withdrawn and swung to one side. After the washers have been pushed up into the chute, the plunger 60 may be introduced into the bottom of the chute and brought up against the bottom of the stack of washers. The rod, upon which the washers are stacked, may then be allowed to drop out of the chute through the interior of the plunger 60.

The chute 58 is attached to the pressure plate 45 by means of a cap at the upper extremity and the chute rises and falls with the pressure plate 45. On the top of the pressure plate 45 is a thin slide 42 which is recessed as indicated at 42ª on its under side to a trifle over the thickness of the washer 105. When the slide 42 is at its extreme left position this recess lies over the top of chute 58 in such a way that by reason of the pressure of the plunger 60 from beneath, the top washer pushes up into this recess. When the slide 42 moves to the right it carries this topmost washer over to its position on the pressure plate over the die. At this point it drops into a depression 45ª in the pressure plate provided for it and thus is prevented from being carried back on the return movement of the slide 42. The small semi-circular plates 44 are guide pieces which retain the slide 42 in its position. The rear portion of the slide 42 is bent down closer to the bed of the press, in order to be out of the way of the fabric 110. At the left end of the slide 42 the post 43 is fastened in the frame 1 of the press, which operates in a slot in the end of the slide 42 and a notch in the rear of slide 42 provides means for engaging the end of the extension bracket 27 which operates the slide.

The pressure plate 45 is supported above the die 103 by means of four plungers 48 which are socketed in four holes 49 in the die holder 47. The plungers rest on springs 115 which compress under pressure from the punch holder 30 allowing the plate 45 to descend to the level of the die 103.

*Punching and eyelet inserting mechanism.*—Attached to the ram 4 of the press is the punch holder 28 and securely fastened to this is a cylindrical punch holding piece 32 which is provided with a central pocket of the exact size of the punch 100 which fits snugly into it.

41 is a sliding pressure foot which operates to bear upon the top of the eyelet 40 within the jaws 34 to force the eyelet down into the fabric 110 lying on the pressure plate 45. This pressure foot 41 is an annular or tubular piece which slides upon the punch 100 and the holder 32 and is provided with pressure from the inner spring 101 shown in Figs. 5 and 6. Surrounding this pressure foot is a sliding holder 30 which carries four piercing blades 39. This holder 30 is provided with the helical pressure spring 29 which surrounds the barrel of the holder 30 bearing upon it at its lower end and upon the upper part of the pressure foot 41 at its upper end. The punch 100 is a straight piece of tempered tool steel oval in shape which fits snugly in the hole of the eyelet 40. The lower end is ground to a cutting edge and fits the hole in the die 103 beneath. The punch 100 is made of the same section throughout in order that it may be ground sharp a large number of times and thus prolong its life. When ground it is to be removed from its holder 32 and on being replaced packing pieces of the thickness of the material ground from its lower face must be placed in the socket above the top of the punch 100 in order to keep the proper and original adjustment between the punch and the die.

The die 103 consists of a block of tempered tool steel rectangular in section of the same outside section from the top to bottom throughout. This block is perforated with an oval hole the size and shape of the punch 100. At its lowest position the punch enters this die to a depth of about $\frac{1}{32}$ or enough to shear out a disk of fabric from the sheet the size and shape of the hole in the die. The hole in the die block enlarges as it approaches the bottom, (usual with this form of blanking dies) in order to relieve the pressure or friction on the side of the oval piece of waste fabric passing through it, thus permitting the piece to fall down and out through the hole in the die holder beneath. The die holder 47 is an iron casting bolted to the bed of the press 6. The die holder is recessed in a manner to hold the die and a clamping block 125 which is pressed against the side of the die block 103 by means of a set screw 111. Arranged around on three other sides and recessed into the die holder are three clenching blocks 104. At the outer edge of each block the upper surface (which is polished and hardened) is curved up slightly to present a slightly inclined surface to the prongs on the eyelet 40 when same come in contact with these blocks in its descending movement. The inclination of this polished surface being inward it forms a sliding surface that draws the points of the prongs inward in a way to start the clenching action in the proper direction. The clamping block 125 has at its upper side a projection of the same section as one of the clenching blocks 104 and which acts as such on the fourth prong of the eyelet.

In operation, when the eyelets 40 are in place in the chute 38 and one is drawn out to its intermediate position on guide block 36 and with the oval washers 105 in place in the chute 58, the operator depresses the treadle on the floor thereby setting the mechanism in motion. Having thus tripped the clutch 8 the operator immediately releases the treadle in order that the press will stop after making one revolution of the crank shaft 2. On being tripped the clutch 8 engages the crank shaft 2 which operates the cam 10 which in turn throws the transfer lever 12 and its connected parts of the upper and lower transfer mechanism to the left during the descending movement of the ram 4. The picker 37 enters the chute between the two lowest eyelets 40 separating them by forcing the lower one down on the bar 50. The spring pawl on the claw 37 rides back over the eyelet 40 on the guide block 36 and snaps down behind the eyelet 40 at the end of the downward stroke of the ram 4. At the same time the slide 42 on pressure plate 45 recedes to the left to its extreme left position over the top of the chute 58. At this point it receives an oval washer 105 in the recess on its under surface. On the reverse or rising movement of the ram 4 the transfer lever 12 swings back to the right moving with it the parts 37 and 42 which carry with them the washer and eyelet. The picker 37 thus operates on two eyelets at once moving one eyelet from chute 38 to guide block 36 and another eyelet from guide block 36 to the jaw 34, whereas the slide bar 42 removes but one washer from the chute 58 to the recess in the pressure plate 45 around the hole over die 103. The cam 10 is of such shape that the eyelet 40 and the washer 105 are moved into their last positions just at the right moment when the punch parts have withdrawn from the location they then take. In this position the machine is primed for operation. Each succeeding stroke of the ram carries one eyelet and one washer into place to replace those inserted in the curtain fabric. The operator now draws the fabric or curtain over the pressure plate and locates the proper point for the eyelet (generally indicated by a small punch mark) under the center of the hole in the jaws 34. It will be noted that the jaws 34 are cut away along the lower portion in order to enable the operator to see the position of the punch mark on the curtain and thus be able to center it more easily. On tripping the clutch the ram now descends carrying the punch parts. With the descent of the ram the jaws 34 are carried downward carrying the eyelet 40 until it encounters the fabric 110 laid upon the top of the pressure plate 45 where the jaws 34 act to clamp the curtain upon the plate which resists the downward movement of the jaws by opposing stronger spring pressure from the four springs 115 in the die holder underneath. As the jaws are thus arrested momentarily in their descent the pressure foot on the sliding holder with the piercing blades 39 descend and enter the jaws 34 the blades 39 slip between the outside of the body of the eyelet 40 and the wall of the jaws 34 which are slightly grooved at these points to permit the entrance of the blades. The blades 39 are of sufficient length to extend slightly beyond the points of the prongs on the eyelet when the bottom of the pressure foot reaches the top of the eyelet. These blades are pointed and ground sharp and are held close to the surface of the prongs during the further descent of the pressure foot and sliding holder 30 which continuing downward forces the blades through the fabric 110 and following the blades the prongs of the eyelet pass through the fine slits thus made in advance of the prong points until the body of the eyelet rests upon the fabric 110. Further movement of the punch parts downward forces the pressure plate with the pierced fabric down until they rest firmly upon the die holder 47. When the sliding holder 30 reaches the top of the jaws 34 it is prevented from further movement in relation to the jaws and the downward reach of the blades 39 is thus limited so that the points of the blades cannot reach the tops of the clenching blocks 104. However, the pressure foot continues to force the eyelet downward until prongs reach the surface of the clenching blocks 104 where they are deflected inwardly and are finally bent in and clenched tight under the pressure of the spring which forces down upon the top of the pressure foot. Thus having completed the clench the pressure foot and eyelet and other spring actuated parts are arrested in their descent and during the further drop of the ram 4 downward are stationary, while the central punch 100 rigidly connected with the ram descends a trifle farther cutting an oval piece out of the fabric. The upward return of the gate reverses the movement of the parts and feeds a fresh eyelet 40 and a fresh washer 105 into place for the succeeding insertion. By this means an eyelet is inserted in the curtain at each stroke of the press.

The invention is not limited to the exact mechanism shown but is capable of many variations within the scope of the following claims, and some features of the machine are reserved for other applications.

What I claim as new is:

1. In a machine for setting pronged eyelets, the combination of a punch, a blade holder surrounding the punch and provided with blades spaced from the punch and adapted to cut openings for the prongs of the eyelets, a die opposite the punch, and clenching blocks surrounding the die, adapted to clench said prongs.

2. In a machine for setting pronged eyelets, the combination of a punch for cutting an eye, a presser surrounding the punch and adapted to press the eyelet to the material, a blade holder surrounding the presser and having blades adapted to cut openings for the prongs, spaced from the eye, a hollow die opposite the punch, and means surrounding the die to clench the prongs after they are inserted through said openings by the presser.

3. In a machine for setting pronged eyelets, the combination of a punch for cutting an eye, a presser surrounding the punch and adapted to press the eyelet to the material, a blade holder surrounding the presser and having blades adapted to cut openings for the prongs, spaced from the eye, a die opposite the punch, and means to clench the prongs after they are inserted through said openings by the presser, the blade holder and presser being yieldable with respect to the punch.

4. In a machine for setting pronged eyelets, the combination of a punch for cutting an eye, a presser surrounding the punch and adapted to press the eyelet to the material, a blade holder surrounding the presser and having blades adapted to cut openings for the prongs, spaced from the eye, a die opposite the punch, and means to clench the prongs after they are inserted through said openings by the presser, the blade holder being yieldable with respect to the presser.

5. In a machine for setting pronged eyelets, the combination of a punch for cutting an eye, a spring pressed presser surrounding the punch and yieldable with respect thereto, a spring pressed holder provided with cutting blades surrounding the presser and yieldable with respect thereto, a die opposite the punch, and means opposite the presser to clench prongs inserted through openings made by said blades.

6. In a machine for setting pronged eyelets, the combination of a ram, a punch carried thereby, a pair of eyelet-holding jaws yieldingly carried by the ram, a presser surrounding the punch and yieldingly carried by the ram and adapted to force an eyelet from the jaws to the material and insert the prongs, and means to clench the prongs when inserted.

7. In a machine for setting pronged eyelets, the combination of a ram, a punch carried thereby, a presser surrounding the punch, a blade holder having blades spaced around the presser, a pair of eyelet-holding jaws arranged to hold an eyelet under the presser, a die opposite the punch, and a clenching device around the die, said presser, blade-holder and jaws being yieldable with respect to the punch and to each other.

8. In a machine for setting pronged eyelets, the combination of a punch, a reciprocating blade holder having blades spaced around the punch, a presser to force the prongs of the eyelet through openings in the material made by said blades, a spring-supported work-supporting plate having an opening opposite the punch, said opening being of larger diameter than the punch to form an annular space around the same into which said blades pass, a die under said opening, and means acting through said annular space and beside the die to clench the prongs, the plate being movable downward to position around the die and said means by the pressure of the presser.

9. In a machine for setting pronged eyelets, the combination of a punch, a reciprocating blade holder having blades spaced around the punch, a presser to force the prongs of the eyelet through openings in the material made by said blades, a spring-supported work-supporting plate having an opening opposite the punch and blades, a die under said opening, the plate being movable with the work to position the latter upon the die, and means beside the die to clench the prongs, said means comprising blocks working into said opening and having inwardly inclined faces to bend the prongs inwardly.

10. In an eyelet setting press, the combination of a plunger, stop mechanism controlling the operation of the plunger, an eyelet feeding device including a lever, and an operative connection between said lever and said mechanism and adapted to operate the latter when the feed is obstructed.

In testimony whereof, I do affix my signature in presence of two witnesses.

CARL A. MAHLER.

Witnesses:
JOHN A. BOMMHARDT,
J. B. DAVIS.